C. L. HOPKINS.
PHOTOGRAPHIC FILM PACK.
APPLICATION FILED MAR. 17, 1913.
1,103,417.
Patented July 14, 1914.
6 SHEETS—SHEET 1.
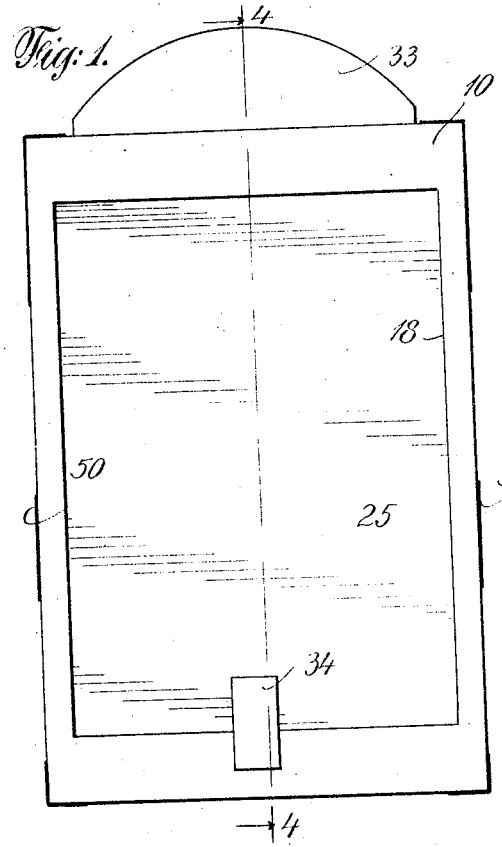
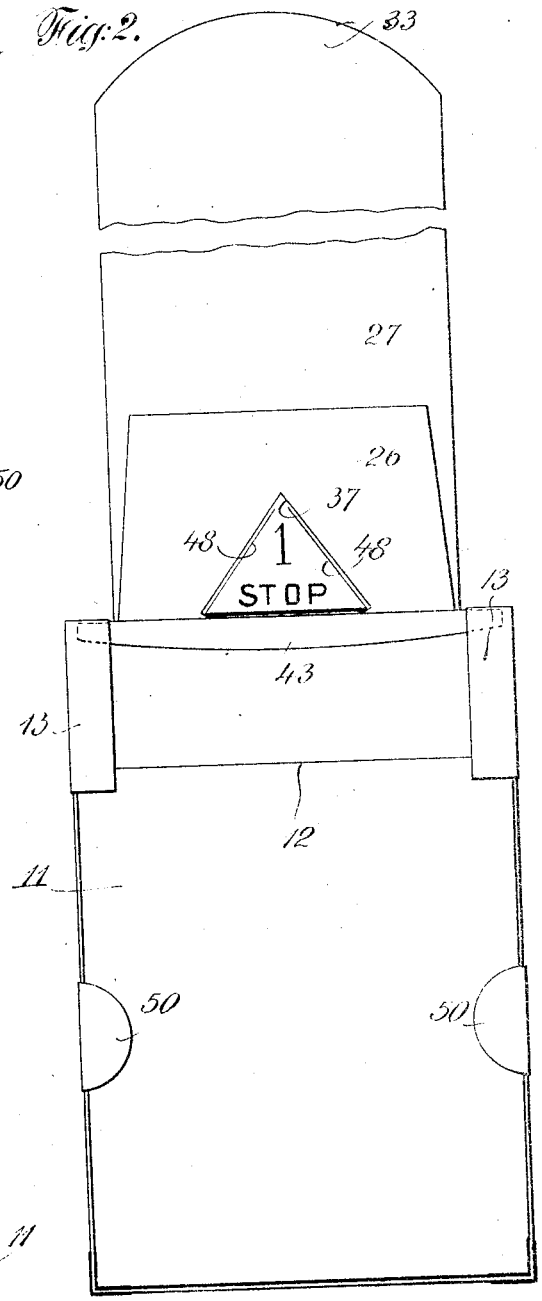
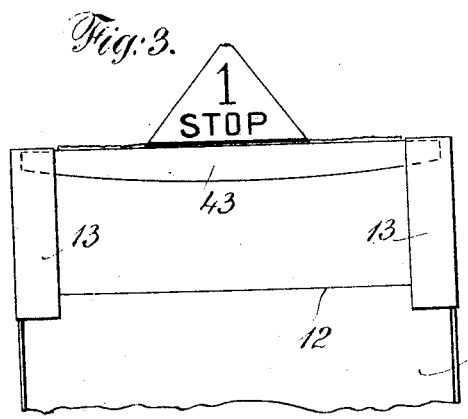
WITNESSES
INVENTOR
Charles L. Hopkins C. L. HOPKINS.
PHOTOGRAPHIC FILM PACK.
APPLICATION FILED MAR. 17, 1913.
1,103,417.
Patented July 14, 1914.
6 SHEETS—SHEET 2.
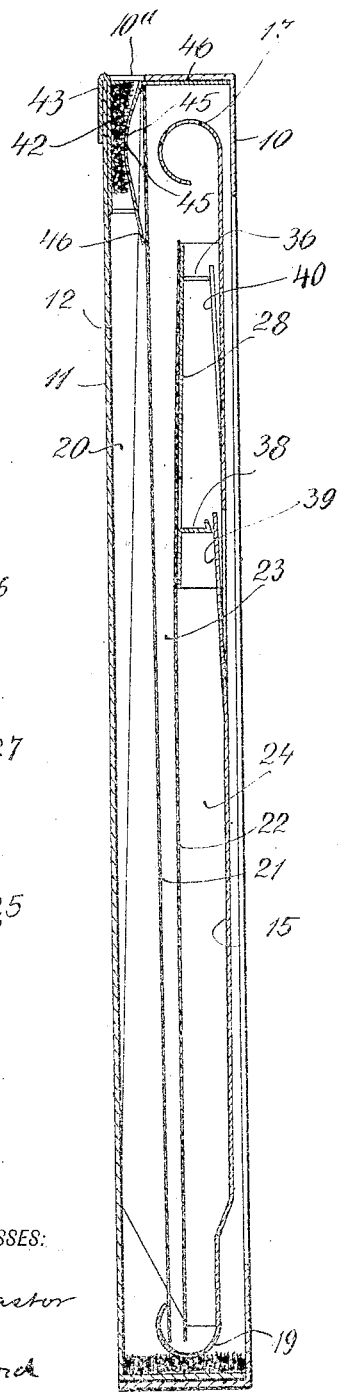
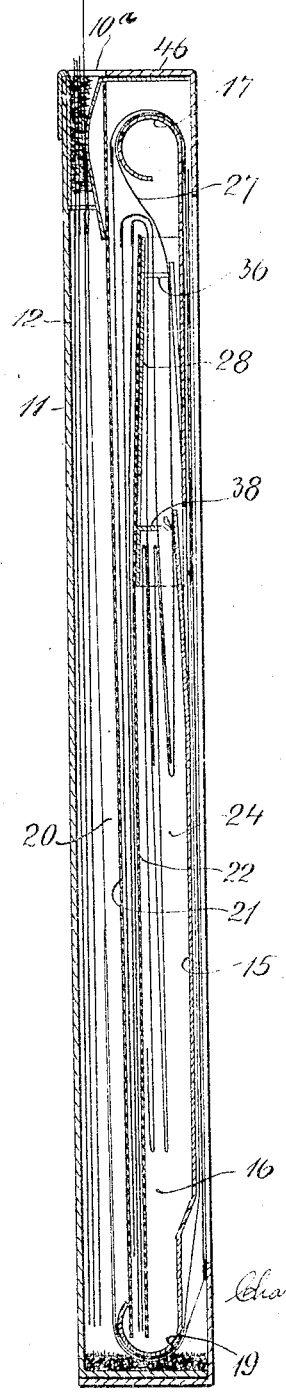
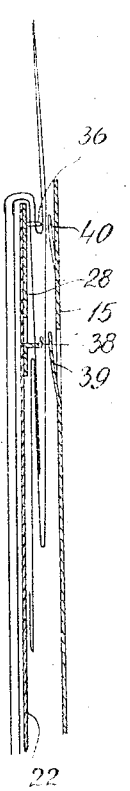
WITNESSES:
Lewis T. Castor
Chas A. Ford
INVENTOR
Charles L. Hopkins C. L. HOPKINS.
PHOTOGRAPHIC FILM PACK.
APPLICATION FILED MAR. 17, 1913.
1,103,417.
Patented July 14, 1914.
6 SHEETS—SHEET 3.
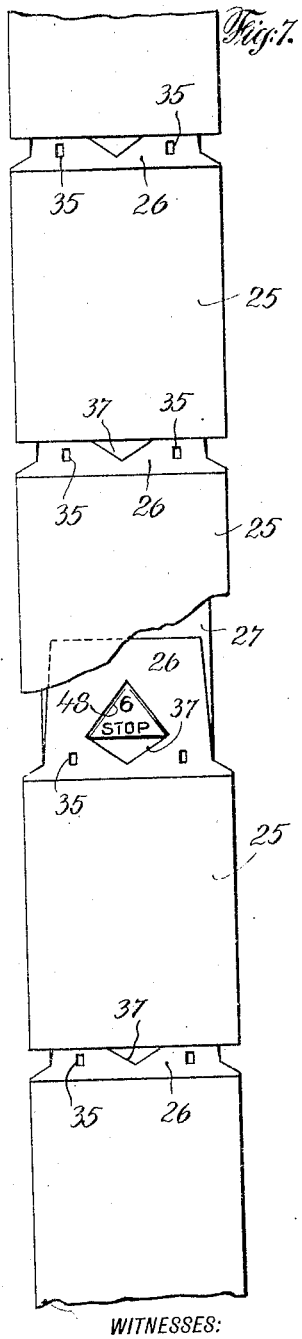
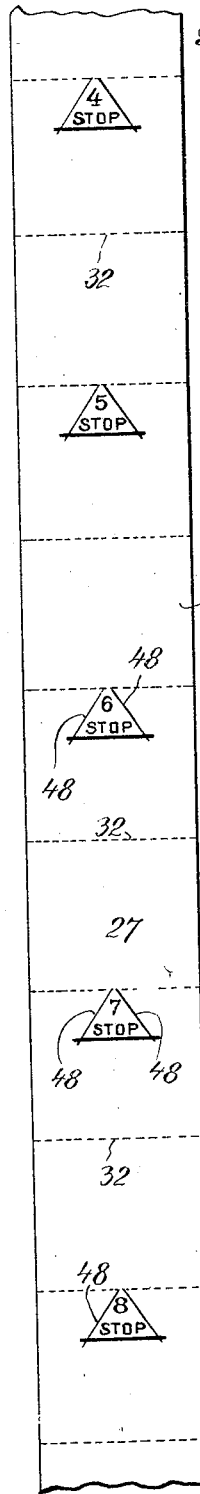
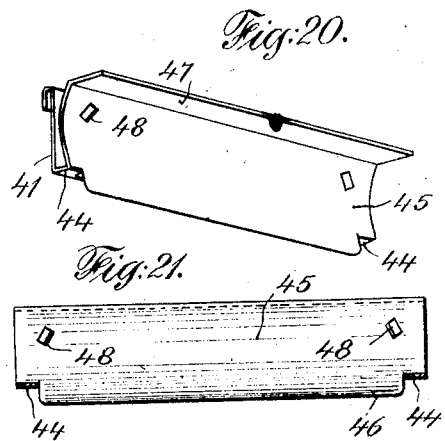
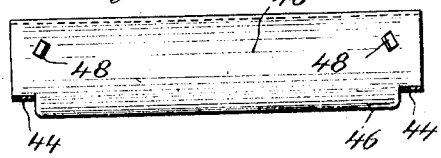
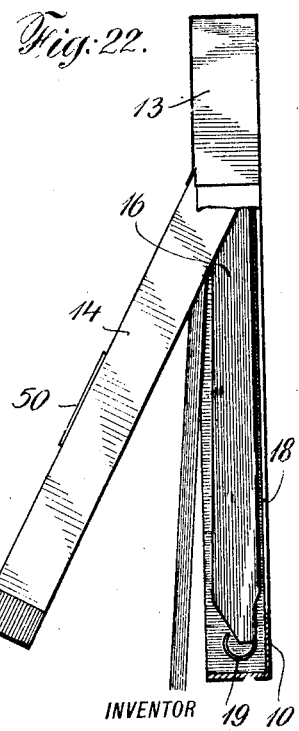
WITNESSES:
Lewis D Castor
Chas A Ford
INVENTOR
Charles L. Hopkins

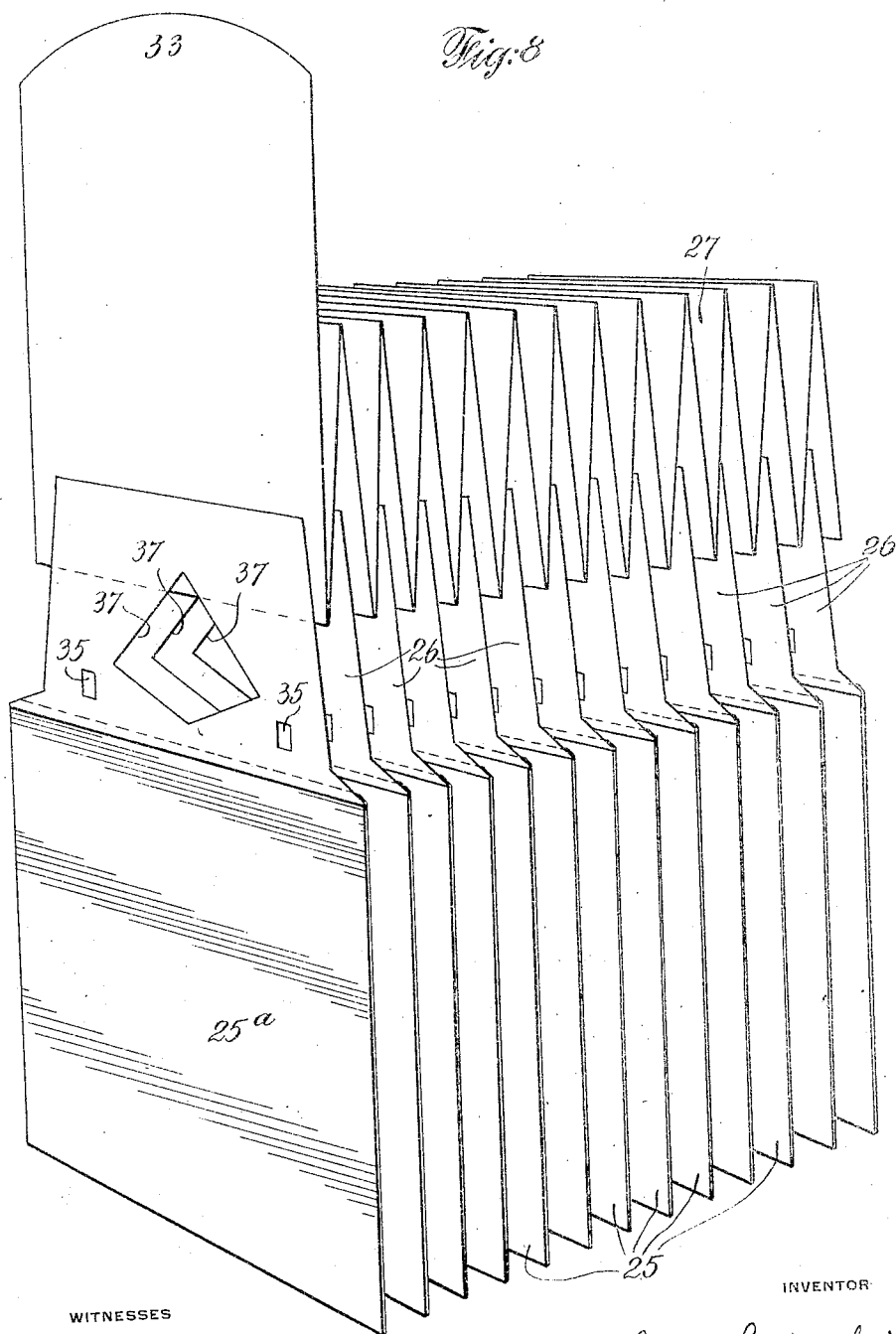

C. L. HOPKINS.
PHOTOGRAPHIC FILM PACK.
APPLICATION FILED MAR. 17, 1913.
1,103,417.
Patented July 14, 1914.
6 SHEETS—SHEET 5.
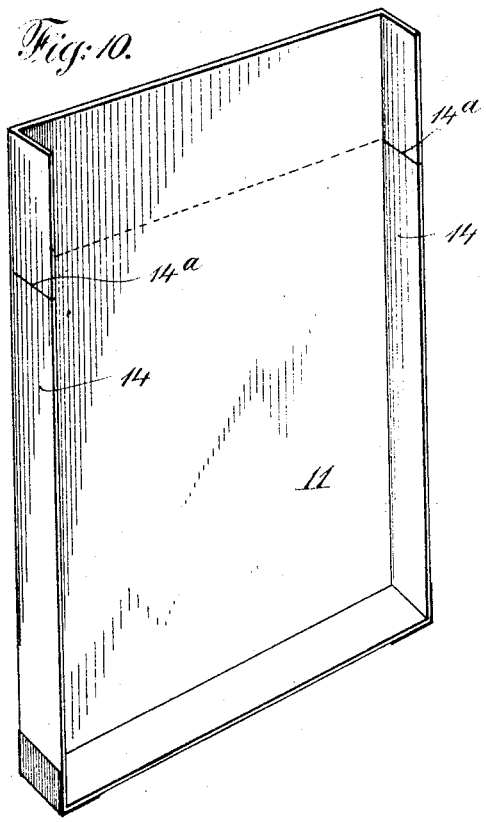
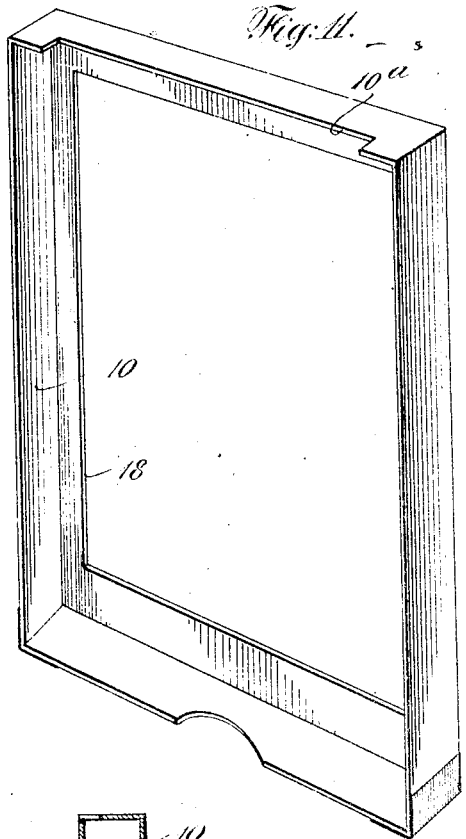
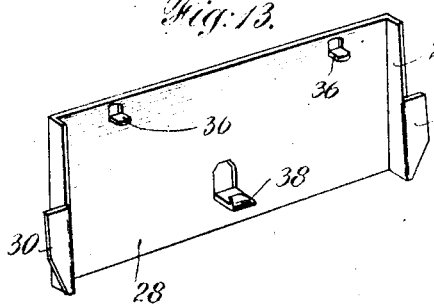
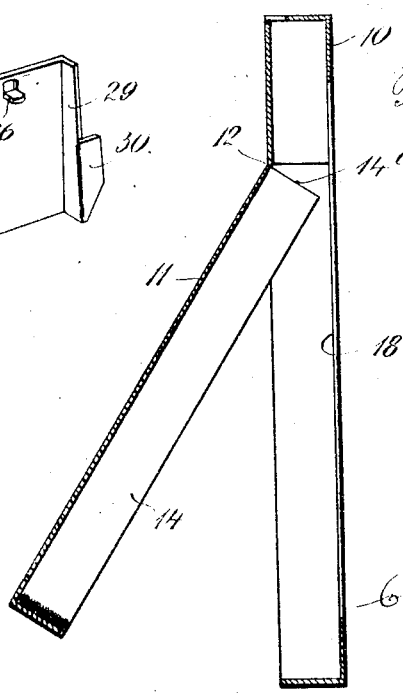
WITNESSES:
Lewis D Castor
Chas A Ford
INVENTOR
Charles L. Hopkins C. L. HOPKINS.
PHOTOGRAPHIC FILM PACK.
APPLICATION FILED MAR. 17, 1913.
1,103,417.
Patented July 14, 1914.
6 SHEETS—SHEET 6.
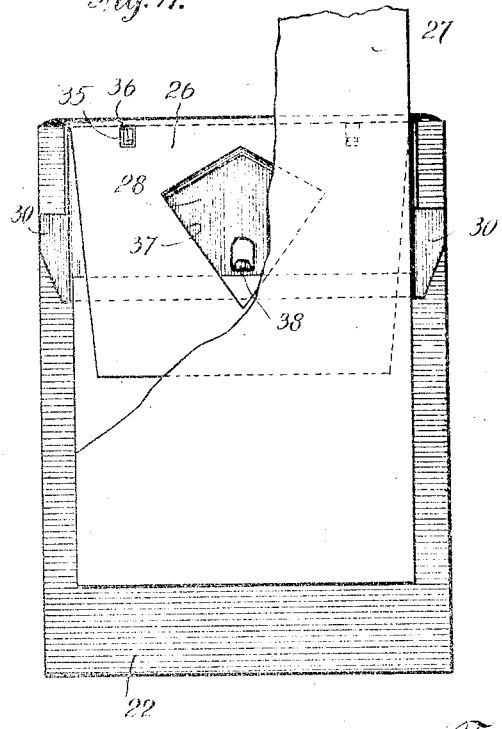
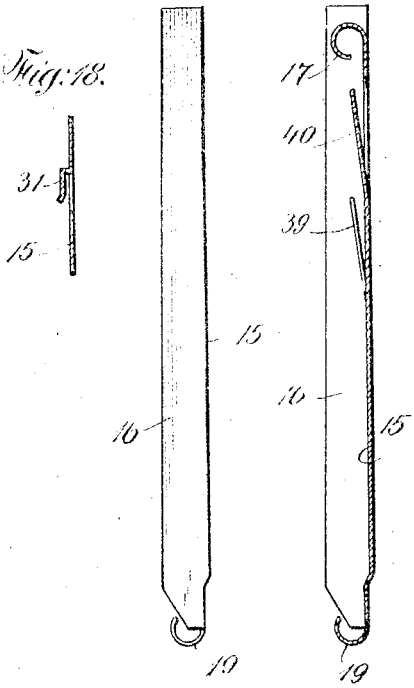
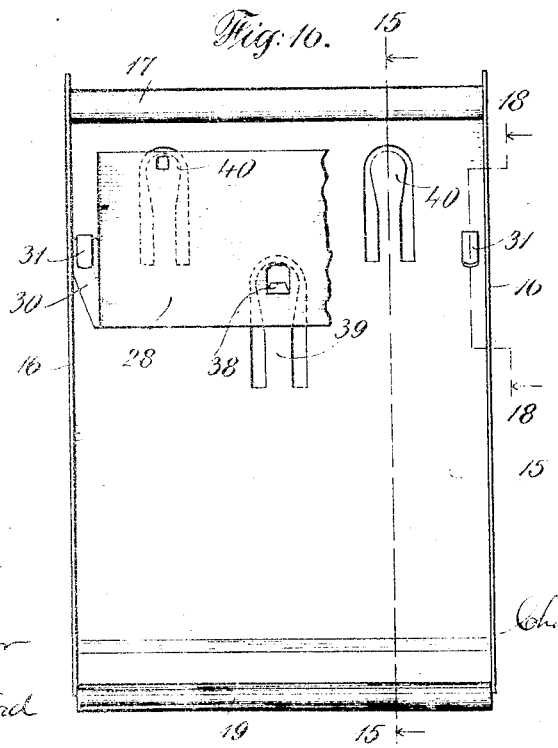
WITNESSES:
INVENTOR
Charles L. Hopkins

UNITED STATES PATENT OFFICE.

CHARLES L. HOPKINS, OF BINGHAMTON, NEW YORK.

PHOTOGRAPHIC-FILM PACK.

1,103,417.

Specification of Letters Patent. Patented July 14, 1914.

Application filed March 17, 1913. Serial No. 754,867.

*To all whom it may concern:*

Be it known that I, CHARLES L. HOPKINS, a citizen of the United States, and a resident of the city of Binghamton, county of Broome, and State of New York, have invented certain new and useful Improvements in Photographic-Film Packs, of which the following is a specification.

This invention relates to improvements upon the film pack shown in my prior Patent No. 1,054,691, dated March 4, 1913, filed October 21, 1910. In my said former pack the films are arranged in a series along a continuous operating band or tab strip and are brought successively to the exposing position by drawing out and tearing off the tab strip length by length as the exposures are successively made.

In the patent referred to above, the tab strip is shown folded down between the films.

One of the principal objects of the present invention is to so arrange this strip and the other parts of the pack that the strip will not be kept stored in contact with the faces of the films.

It is known that sensitized film, such as is used in film packs, will keep in good condition longer when the layers are in contact with each other than when paper or similar material is interposed between them. Consequently in the pack described in this specification and shown in the accompanying drawings, the construction is such that the films are kept in contact with each other over their entire surface and are held flat and straight.

Another object of the invention is to provide a construction which permits the pack to be opened for the removal of such of the exposed films as may be desired and closed again light-tight.

Another object of the invention is to assure the successive removals of the end of the tab strip in such manner as to surely leave a projecting tab or part of the strip for its next succeeding manipulation.

A still further object is to provide means for holding back all of the films in the unexposed film chamber except the one that is being drawn around to the exposing position, thus preventing the clogging of the device occasioned by several films starting at the same time to pass out of the chamber.

These and such other objects as may hereinafter be pointed out are accomplished in the manner and by the construction shown in the accompanying drawings, in which—

Figure 1 illustrates a front elevation of the pack; Fig. 2 illustrates a rear elevation, showing the pack after the first length of the tab strip has been drawn out and before the same has been torn off; Fig. 3 illustrates a broken rear elevation of the pack after the tab strip has been torn off to form the first numbered tab; Fig. 4 illustrates a longitudinal section of the pack after a portion of the films have been shifted to the exposed film chamber by drawing out and tearing off the tab strip several times, the section being taken on the line 4—4 of Fig. 1, looking in the direction indicated by the arrows; Fig. 5 illustrates a section similar to Fig. 4, but omitting the films and operating band or tab strip; Fig. 6 illustrates an elevation of a portion of the tab strip; Fig. 7 illustrates an elevation of a portion of the strip with films attached; Fig. 8 illustrates in perspective the tab strip, the first or dummy front piece and the films in rear thereof attached to the tab strip and folded ready for insertion in the pack; Fig. 9 illustrates diagrammatically how the films and tab strip are disposed when in the pack; Fig. 10 illustrates in perspective the rear member of the casing of the pack; Fig. 11 illustrates in perspective the front member of the casing; Fig. 12 illustrates a section of the complete casing, showing the hinged portion of the rear member opened as when the exposed films are to be removed; Fig. 13 illustrates in perspective a plate, preferably of sheet metal, which separates the films from the folded back tab strip in the assembled pack, showing also the means provided for holding the films and folded tab strip in place within the pack; Fig. 14 illustrates an edgewise elevation of the inner box which in effect constitutes the supporting frame of the pack; Fig. 15 illustrates a longitudinal section of the same taken on the line 15—15 of Fig. 16; Fig. 16 illustrates an elevation of the inner box with the plate of Fig. 13 in place therein, the latter being partly broken away; Fig. 17 illustrates a step in the process of assembling the packs and showing the plate of Fig. 13, together with a partition having the same dimensions as the films, the latter being placed behind the partition and secured to the tab strip by attaching pieces which are folded down over the upper end of the partition and plate; Fig. 18 illustrates a section of a detail, the section being taken on the line 18—18 of Fig. 16; Fig. 19 illustrates diagrammatically how the leading devices for the films become successively released at the proper time so that the films may be successively drawn from the exposed film chamber; Fig. 20 illustrates in perspective a member which is arranged at the upper end of the pack and carries the light-excluding elements and stops for limiting the movement of the films; Fig. 21 illustrates a longitudinal section of the parts shown in Fig. 20, looking toward the front of the pack; Fig. 22 illustrates an elevation, partly in section, showing the method of removing the exposed films from the pack.

The casing of the pack comprises a front member 10 and a rear member 11 which are preferably formed of some light weight, opaque material, such as black press-board, metal, or equivalent material. The rear member 11 telescopes into the front member 10 and is scored or creased at 12. Pasters 13, 13, are secured to the sides of the front member of the casing at the upper end of the latter and extend around upon the rear member to secure the same in place. These pasters preferably extend downward slightly below the scored line 12. The side flanges 14, 14, of the rear member are slit at 14ª, 14ª, to permit the lower portion of the rear member to open outward, hinging at the scored line, as seen in Figs. 12 and 22. This affords access to the rear chamber of the pack for the removal of exposed films, if desired, as will be explained hereinafter. The upper end of the front member 10 of the casing is formed with a narrow cut-out 10ª, along its rear edge, which forms an opening through which the operating band or tab strip is drawn. Within the casing is arranged a box-like structure consisting of a flat septum plate 15 having its side edges upset to form stiffening flanges 16, 16. The upper end of this plate is rolled over to form a curved rail 17, over which the films are drawn to bring them one by one to the exposing position in register with the exposing aperture 18 in the front member of the casing. The lower end of this plate is rolled rearwardly to form a second curved rail 19, under which the films pass when they are drawn from the exposing position to the rear chamber 20. The side flanges 16 of the metal box are extended upwardly beyond the curved rail 17 and thrust against the upper wall of the casing to maintain the box in its proper position when the films are being shifted by drawing on the tab strip. A partition 21 which is preferably formed of heavy black paper, has its lower end inserted into the curved rail 19 of the metal box-like structure and divides the rear portion of the interior of the pack from the remainder of this space, thus providing a separate chamber for the exposed films. A second partition 22, also preferably of heavy black paper, again divides the remaining space into two chambers 23 and 24. The unexposed films 25 are stored in the chamber 23 and are attached by stickers 26 of paper or the like to the operating band 27. The stickers operate as film-leaders for the several films. The band 27 is folded as shown most clearly in Figs. 8 and 9, and is arranged in the chamber 24. The partition 22 is secured to a stiff plate 28, preferably of sheet metal. This plate is shown by itself in Fig. 13 and is provided with upset ends 29, 29, which have formed thereon out-turned wings 30, 30, which rest against the inner surface of the septum plate 15. The plate 28 is held in position by small tongues 31 which are sheared from the material of the septum plate and offset from the face of the same so that the wings 30, 30, of the plate 28 may be inserted under them.

The tab strip 27 may be formed of any suitable material, preferably tough paper, and before having the films attached thereto, it is creased at equidistant points, so that it may be folded on the dotted lines designated 32 in Fig. 6. One edge of each sticker 26 is attached to a film, the opposite or leading edge of the sticker being attached to the tab strip. When the strip is folded as seen in Fig. 8 and placed with the attached films in the pack, the stickers, or film-leaders, are folded over the upper end of the partition 22 and the upper edge of the plate 28 downward into the chamber 24, together with the folds of the tap strip. The leading end of the strip passes upwardly and over the curved rail 17, thence downward in front of the septum plate 15, thence under the lower curved rail 19 and up through the exposed film chamber 20, passing out at the upper end of the casing and terminating in a short tab 33.

In addition to the series of films, usually twelve in number, there is provided a dummy 25ª, formed of black paper or other suitable material, having the same dimensions as a film and attached to the tab strip by a sticker similar to those used with the films. This dummy is so placed on the strip that it becomes the first one in the series of thirteen elements carried by the tab strip and is in register with the exposing aperture when the pack is assembled ready for sale. When the pack is placed in the hands of the user, this dummy is held against shifting by a paper seal 34 which is secured to the dummy and the front of the casing (see Fig. 1). This seal must be broken before the pack is placed in the camera, so that the tab strip may be drawn out to shift the dummy to the rear or exposed film chamber and bring the first sensitized film to the front of the pack.

Each film-leader 26 is formed with two perforations, 35, 35. The plate 28 is provided with a pair of small tongues 36, 36, which extend toward the front of the pack and pass through the perforations 35, 35, of the film-leaders. Each leader is also provided with a large opening 37 and the plate 28 is formed with a tongue 38 which extends through these openings. By reference to Fig. 8, it will be observed that the leaders are secured to the folded tab strip 27 at points which are just above the edge made by the folds in the tab strip, the relation being such that the edges formed by folding the tab strip may be seen through the large openings 37 in the film leaders.

In assembling the pack the films are placed against the rear side of the partition 22, the film-leaders being bent forward over the top of the partition, and the folded tab strip is caught under the tongue 38, as seen in Fig. 17, which shows these parts assembled. The short tongues 36 which project through the holes 35 in the film-leaders, hold the films against sliding up above the upper end of the partition. The leaders are unhooked and released one by one as the tab strip is drawn up. (See Fig. 19.)

The plate 15 is provided with three resilient fingers, the free ends of which tend to move inward. One of these fingers designated 39, presses toward the tongue 38, while the fingers 40, 40, press toward the ears 36. The portion of the tab strip which is being drawn from the space below the tongue 38 is pressed against the end of the tongue by the finger 39 and the folds of the tab strap are thus prevented from prematurely working up beyond the tongue. As the strip is drawn out, one fold after another is caused to straighten out before it passes between the end of the tongue and the finger 39. The fingers 40, 40 retain the film-leaders 26 upon the short tongues 36 (see Fig. 19) until they are released by their rolling back upon themselves and this is accomplished without the leaders being torn or otherwise injured.

In the upper end of the pack is arranged an end piece which carries stops adapted to engage with shoulders on the film, thus arresting the movement of each film after it has passed into the rear chamber of the pack. This end piece is provided with light-excluding means to prevent the passage of light inwardly through the opening through which the tab strip is drawn. This end piece is preferably formed of sheet metal and comprises a part 41 which extends across the upper portion of the inner side of the rear section of the casing. This part carries a strip 42 of yielding light-excluding material, such as plush, and has its upper edge 43 bent outward and downward over the edge of the rear section of the casing, thus forming a stiffening device and a straight edge over which the tab strip may be torn. At the lower edge of this part 41 are the two stops 44, 44, between which the tab strip passes and by which the films are arrested. The spacing of the films along the strip is such that when a film engages these stops, the next film in the series will be in register with the exposing aperture. The end piece comprises also a convex part 45 against which the light-excluding strip 42 presses the tab strip, and a downwardly extending lip 46 which is inclined at its lower edge away from the rear wall of the pack and away from the tab strip. Extending forward from the upper edge of the curved portion 45 of the end piece is a flange 47 which engages along its front edge the front wall of the casing of the pack and acts as a distance piece to hold the convex portion 45 at the proper distance from the portion 41. As the films accumulate in the rear chamber, the torn leaders occupy more and more of the space in the passageway between the front and rear portions of the end piece, and since the end piece is prevented from opening by reason of its abutting the front and rear sections of the casing, the increased bulk of the film leaders will be compensated for by the compression of the plush 42, and this is the intent because thereby light is prevented from entering at the edges of the accumulated film leaders.

The partition 21 engages near its upper end with the lip 46 of the end piece and is permitted to yield rearwardly above this point when a film is passing over the curved rail 17. The film offers considerable resistance to bending and consequently bears against the partition with a certain amount of pressure. Were the partition too stiff, or were the part 45 flat, this pressure would be localized along a line extending across the partition parallel with and about opposite the horizontal diameter of the rail 17. In that event the sensitive emulsion would be likely to show abrasion or pressure marks upon development, whereas with the construction described the pressure is distributed over a considerable area and is not sufficiently great at any point to injure the film.

The portion 45 of the end piece is formed with a pair of small tongues 48, 48, which are preferably sheared from the material of the end piece and bent inward, the ends of these tongues being embedded in the plush strip 42. These tongues form side guides to maintain the tab strip in a central position as it is being drawn out to shift the films. In order that the edges of the tab strip may not be roughened by the lower edges of these guides, the latter are inclined away from the strip at their lower portions, the guides thus meeting the edges of the strip obliquely and tending to roll in the edge of the latter should it be drawn to one side through careless manipulation.

At regular intervals the tab strip is formed with a pair of slits 48, 48, which are located away from the edges of the strip and are inclined with respect to each other and to the edges of the strip. They form the side edges of tabs which are narrower than the tab strip. These slits are but slightly separated from each other at their upper ends. Upon each of these tabs with the exception of the last one of the series, is printed the number of the film which will occupy the exposing position at the front of the pack when that tab appears at the upper end of the pack, as seen in Fig. 3. When the tab strip is unfolded, as in Fig. 7, these numbered tabs are seen through the openings 37 in the film leaders, the same being true when a film has passed into the rear chamber of the pack and before the strip has been torn off (see Fig. 2). If the tab strip be grasped after a length has been drawn out and the strip and film leader be torn off along the straight-edge on a camera or adapter or the edge of the metal end piece of the pack, the line of tear will meet one of the slits 48 in the band which it will be noted extends in the same general direction as the tear, so that there is no danger of the tear extending across the tab; on the contrary, the line of severance will follow up the slit first encountered and tear across the small uncut part at the converging upper ends of the slits and will then follow down the second slit to the point where the other slit meets the tearing edge of the pack, (or camera or adapter) and will thence extend along such edge to the side margin of the tab strip, thus leaving a small substantially triangular tab (see Fig. 3) the latter bearing the number of the film which is at that time in the exposing position. The openings in the film leaders are preferably given a form substantially the same as that in the tabs and I prefer also to make them slightly wider where the strip is to be torn off than the widest part of the resulting tab. The purpose of this construction is to assure the complete severance of the film leader somewhat before the tear of the tab strip has reached the first slit in it.

It is desirable in a device of this class that the same be so constructed that such films as have been exposed and are wanted for development may be removed at any time without waiting until others of the pack have been exposed. To provide for this, it will be observed that the side flanges 14 of the rear member of the casing which is hinged to allow the removal of the films from the rear chamber, enter the narrow space between the side flanges of the metal inner box and the side flanges of the outer or front member of the casing. Thus the entrance of light to either of the chambers in which film is stored is prevented.

A pair of paper seals 50, 50, may be provided to prevent opening of the casing during its commercial manipulation and before the pack is used. These seals will of course be broken when it is desired to remove the exposed films. The rear section of the casing being then swung outward, as explained and as shown in Fig. 22, access is accorded to the rear chamber and the exposed films may be easily withdrawn. Upon again closing the rear section, its flanges 14, 14, will again enter the narrow space between the flanges of the inner and outer boxes of the casing and light-tightness will result without necessity for any resealing.

I claim:

1. A tab strip for a photographic film pack, having within its borders a pair of slits forming the side margins of a tab narrower than the strip, converging toward each other at their upper ends and inclined with relation to the side margins of the strips at the points where the slits intersect the line upon which the strip is to be torn, whereby the tab is protected against severance during the tearing of the strip, an uncut portion of the strip being left at the nearer ends of the slits, whereby the tab is prevented from folding back.

2. In a photographic film pack, the combination with a casing having an exposing aperture, of a series of films in the casing lying in contact with each other over substantially their whole areas, film manipulating means, film leaders connecting each film to the manipulating means, and means within the casing for separating the films from the manipulating means and leaders.

3. In a photographic film pack, the combination with a casing having an exposing aperture, of a series of films in the casing lying in contact with each other, folded film manipulating means, film leaders connecting each film to the manipulating means, means within the casing for separating the films from the manipulating means and leaders, and means to control the unfolding of the manipulating means.

4. In a photographic film pack, the combination with a casing having an exposing aperture, of a series of films in the casing, folded film manipulating means, film leaders connecting each film to the manipulating means, means within the casing for separating the films from the manipulating means and leaders, and resilient means to control the unfolding of the manipulating means and leaders, whereby rupture of them is avoided.

5. In a photographic film pack, the combination with a casing having an exposing aperture, of a septum in the casing covering the aperture, a series of films arranged in contact with each other behind the septum, film manipulating means extending over one end of the septum, thence across its outer face, thence under its other end and thence to the exterior of the casing, and film leaders connecting the films to the manipulating means.

6. In a photographic film pack, the combination with a casing having an exposing aperture, of a septum in the casing covering the aperture, a series of films arranged in contact with each other behind the septum, folded film manipulating means extending over one end of the septum, thence across its outer face, thence under its other end and thence to the exterior of the casing, and film leaders connecting the films to the manipulating means, the films being separated from the manipulating means and leaders.

7. In a photographic film pack, the combination with a casing having an exposing aperture, of a septum in the casing covering the aperture, folded film manipulating means arranged behind the septum, extending over one end of the septum, thence across its outer face, thence under its other end, and thence to the exterior of the casing, a series of films arranged behind the manipulating means, and individual means connecting each film to its appropriate fold of the manipulating means.

8. In a photographic film pack, the combination with a casing having an exposing aperture, of a septum in the casing covering the aperture, the casing being divided interiorly into three chambers, a series of unexposed films in one of the chambers, and folded film manipulating means connected with each of the films in another of the chambers and extending around the ends of the septum through the focal plane and passing thence through the third chamber to the exterior of the pack.

9. In a photographic film pack, the combination with a casing having an exposing aperture, of a septum facing the aperture, means to divide the interior of the casing in rear of the septum into three chambers, a series of films in one of the chambers, a continuous film manipulating member connected with each of the films, in another of the chambers and adapted to lead them in succession around one end of the septum to and through the focal plane, thence around its opposite end into the third chamber, and stops to arrest the movement of the films when in said third chamber, the films being so spaced along the manipulating member that when they successively engage the stop, the next succeeding film will register with the exposing aperture.

10. In a photographic film pack, the combination with a casing having an exposing aperture, of a septum in the casing covering the aperture, means to divide the casing in rear of the septum into three chambers, a series of films, and a film manipulating member to which the films are individually attached, adapted to draw them around the ends of the septum and embodying a series of partly formed tabs, the attachment of the films being adjacent to the partly formed tabs, the film attaching devices and the manipulating member being both severable outside of the casing, whereby the films will be detached from the manipulating member and the formation of the tabs completed, the unexposed films being stored in one of said chambers, the manipulating member and film attaching devices in another of said chambers and the exposed films in the third chamber.

11. In a photographic film pack, the combination with a casing having an exposing aperture, of a septum in the casing covering the aperture, means to divide the casing in rear of the septum into three chambers, a series of films, a film manipulating member to which the films are individually attached, adapted to draw them around the ends of the septum and embodying a series of partly formed tabs, the film attaching devices and the manipulating member being both severable outside of the casing, whereby the films will be detached from the manipulating member and the formation of the tabs completed, the unexposed films being stored in one of said chambers, the manipulating member and film attaching devices in another of said chambers and the exposed films in the third chamber, and a stop to arrest the movement of the films in the third chamber, the films being so spaced along the manipulating member that when a film engages the stop the next succeeding film will register with the exposing aperture.

12. In a photographic film pack, the combination of a casing having an exposing aperture, and a septum covering the aperture, the front surface of the septum being substantially in the focal plane and its ends rearwardly curved, the space behind the septum and within its curved ends being divided into three chambers, one for the storage of unexposed films, another for the storage of film manipulating means and the third for the storage of exposed film.

13. In a photographic film pack, the combination of a casing having an exposing aperture, and a septum covering the aperture, the front surface of the septum being substantially in the focal plane and its ends rearwardly curved, the space behind the septum and within its curved ends being divided into three chambers, one for the storage of unexposed film, another for the storage of film manipulating means and the third for the storage of exposed film and provided with means to arrest the movement of the exposed films as they are successively drawn thereinto.

14. In a photographic film pack, the combination of a casing having an exposing aperture, and a septum covering the aperture, the front surface of the septum being substantially in the focal plane and its ends rearwardly curved, the space behind the septum and within its curved ends being divided into three chambers, one for the storage of unexposed film, another for the storage of folded film manipulating means and provided with means to control the unfolding thereof, and the third for the storage of exposed film and provided with means to arrest the movement of the exposed films as they are successively drawn thereinto.

15. In a photographic film pack, the combination of a casing having an exposing aperture, and a septum facing the aperture, the front surface of the septum being substantially in the focal plane, the space in the rear of the septum being divided into three chambers, one adapted for the storage of unexposed film, another for the storage of folded film manipulating means and provided with means to control the unfolding thereof, and the third for the storage of exposed film and provided with stops to limit the movement of the films as they are successively drawn thereinto.

16. In a photographic film pack, the combination of a casing having an exposing aperture, and a septum facing the aperture, the front surface of the septum being substantially in the focal plane, the space in rear of the septum being divided into three chambers, one adapted for the storage of unexposed film, another for the storage of folded film manipulating means and provided with means to control the unfolding thereof, and the third for the storage of exposed film and provided with stops to limit the movement of the films as they are successively drawn thereinto, the rear of the casing being hinged whereby exposed film may be removed from the third chamber.

17. In a photographic film pack, the combination of a casing having an exposing aperture, and a septum facing the aperture, the front surface of the septum being substantially in the focal plane, and its ends rearwardly curved, the space behind the septum and within its curved ends being divided into three chambers, one adapted for the storage of unexposed films, another for the storage of folded film manipulating means and provided with means to control the unfolding thereof, and the third for the storage of exposed films and provided with stops to limit the movement of the films as they are successively drawn thereinto, the rear of the casing being hinged whereby exposed films may be removed from the third chamber.

18. In a photographic film pack, the combination of a casing comprising two telescoping parts, the outer of said parts having an exposing aperture, and a septum within the casing provided with lateral flanges and facing the exposing aperture, the front surface of the septum being substantially in the focal plane, the space in rear of the septum being adapted for the storage of unexposed and exposed film and folded film manipulating means, the inner of said telescoping parts being hinged, so that it may be opened for the removal of exposed film and when closed its edges enter between the sides of the outer telescoping part of the casing and the flanges of the septum, thus securing light-tightness.

19. In a photographic film pack, the combination of a casing comprising two telescoping parts, the outer of said parts having an exposing aperture, and a septum within the casing provided with lateral flanges, the front surface of the septum being substantially in the focal plane and its ends rearwardly curved, the space in rear of the septum and within its curved ends being divided into three chambers, the one next to the septum being adapted for the storage of folded film manipulating means, the next one for the storage of unexposed films and the rear one for the storage of exposed films, the inner of said telescoping parts of the casing being hinged, so that it may be opened for the removal of exposed films from the rear chamber and when closed its edges enter between the sides of the outer telescoping part and the lateral flanges of the septum, thus securing light-tightness.

20. In a film pack, an inner box, having side flanges, combined with an outer casing comprising a front member formed with an exposing aperture and a hinged rear member; said rear member being provided with flanges which enter between the flanges of the inner box and the sides of said front member when the casing is closed.

21. In a photographic film pack, an exterior casing, a front plate substantially in the focal plane adapted to aid in determining the position of the films during exposure, a single continuous film manipulating tab strip embodying partly formed tabs, individual films attached to the strip adjacent to the partly formed tabs, designations upon the partly formed tabs to identify the individual films, the films and the tab strip being so assembled that unexposed films are isolated from the tab strip and from exposed films, and means whereby the formation of the partly formed tabs may be completed by appropriate manipulation on the exterior of the pack.

In testimony whereof, I have signed my name to this specification in the presence of two subscribing witnesses.

CHARLES L. HOPKINS.

Witnesses:
  ARTHUR E. O'HARA,
  ALBERT M. OSTERHOUT.